(12) United States Patent
Jin et al.

(10) Patent No.: US 12,235,344 B2
(45) Date of Patent: Feb. 25, 2025

(54) RADAR TARGET DETECTION METHOD BASED ON ESTIMATION BEFORE DETECTION

(71) Applicant: NANJING UNIVERSITY OF AERONAUTICS AND ASTRONAUTICS, Jiangsu (CN)

(72) Inventors: Benzhou Jin, Jiangsu (CN); Yutong Shen, Jiangsu (CN); Jianfeng Li, Jiangsu (CN); Xiaofei Zhang, Jiangsu (CN); Qihui Wu, Jiangsu (CN)

(73) Assignee: NANJING UNIVERSITY OF AERONAUTICS AND ASTRONAUTICS, Jiangsu (CN)

( * ) Notice: Subject to any disclaimer, the term of this patent is extended or adjusted under 35 U.S.C. 154(b) by 400 days.

(21) Appl. No.: 17/732,531

(22) Filed: Apr. 29, 2022

(65) Prior Publication Data
US 2023/0059515 A1    Feb. 23, 2023

Related U.S. Application Data

(63) Continuation of application No. PCT/CN2021/104677, filed on Jul. 6, 2021.

(30) Foreign Application Priority Data

Jul. 28, 2020  (CN) .......................... 202010736841.4

(51) Int. Cl.
  *G01S 13/50*  (2006.01)
  *G01S 13/58*  (2006.01)
(52) U.S. Cl.
  CPC .......... *G01S 13/505* (2013.01); *G01S 13/583* (2013.01)

(58) Field of Classification Search
  None
  See application file for complete search history.

(56) References Cited

U.S. PATENT DOCUMENTS

| | | | |
|---|---|---|---|
| 6,141,373 A * | 10/2000 | Scott | .................. H04B 1/70755 375/150 |
| 10,620,296 B1 | 4/2020 | Ezal et al. | |
| 2022/0268911 A1 * | 8/2022 | Wu | ........................... G01S 7/41 |

FOREIGN PATENT DOCUMENTS

| CN | 102279387 | 12/2011 |
|---|---|---|
| CN | 103969629 | 8/2014 |

(Continued)

OTHER PUBLICATIONS

Xie et al., A Recursive Angle-Doppler Channel Selection Method for Reduced-Dimension , Mar. 17, 2020â IEEE Transactions on Aerospace and Electronic Systems (vol. 56, Issue: 5, 2020, pp. 3985-4000). ( Year: 2020).*

(Continued)

*Primary Examiner* — Vladimir Magloire
*Assistant Examiner* — Brandon James Henson
(74) *Attorney, Agent, or Firm* — JCIPRNET

(57) ABSTRACT

The present invention provides a radar target detection method based on estimation before detection (EBD), which comprises: obtaining pre-detect targets (PDTs) based on conventional pulse-Doppler processing and pre-detection; estimating ranges and speeds of PDTs, i.e., performing parameter EBD; establishing a dimension-reduction observation model of a received signal based on PDTs and parameter thereof; reconstructing a target vector in the dimension-reduction observation model based on a sparse recovery algorithm; and designing a generalized likelihood ratio detector based on the reconstruction result for target detection. The method of the present invention can significantly reduce the radar signal processing loss, and the target (Continued)

detector used in the method has the constant false alarm rate (CFAR) property, so that the weak target detection performance can be greatly improved.

4 Claims, 7 Drawing Sheets

(56) References Cited

FOREIGN PATENT DOCUMENTS

| | | | |
|---|---|---|---|
| CN | 104914421 | 9/2015 | |
| CN | 106324596 | 1/2017 | |
| CN | 106324596 B * | 4/2019 | ............. G01S 13/89 |
| FR | 3051918 A1 * | 12/2017 | ......... G01S 13/5244 |

OTHER PUBLICATIONS

"International Search Report (Form PCT/ISA/210) of PCT/CN2021/104677," mailed on Sep. 28, 2021, pp. 1-5.
"Written Opinion of The International Searching Authority (Form PCT/ISA/237) of PCT/CN2021/104677," mailed on Sep. 28, 2021, pp. 1-4.

* cited by examiner

RADAR TARGET DETECTION METHOD BASED ON ESTIMATION BEFORE DETECTION

CROSS-REFERENCE TO RELATED APPLICATION

This application is a continuation of international PCT application serial no. PCT/CN2021/104677, filed on Jul. 6, 2021, which claims a priority and benefit of China patent application No. 202010736841.4 filed on Jul. 28, 2020. The entirety of each of the above-mentioned patent applications is hereby incorporated by reference herein and made a part of this specification.

TECHNICAL FIELD

The present invention relates to the field of radar signal processing, in particular to a radar target detection method based on estimation before detection (EBD).

BACKGROUND

The conventional radar signal processing is generally based on a matched filter, and adopts an architecture of detection before estimation; and in order to reduce the effect of sidelobes of strong scattering point in three domains of space, time and frequency on the detection of a weak target, it is required to perform windowing on original data before filtering. Meanwhile, since target parameters are unknown, filter parameters cannot be matched a true target. The above factors cause mismatch loss of matched filtering, thereby greatly reducing the radar target detection performance.

A sparse recovery-based method provides a feasible idea for solving the above problems. A observation matrix $A_{od}$ is constructed by discretizing a target parameter space, and a received echo signal can be represented as $y=A_{od}x+n$, wherein x represents a target vector to be reconstructed, and n represents noise. Then, the reconstruction and parameter estimation of the target can be realized by solving x. Generally, x is sparse, and the solving x can be summarized as sparse recovery. However, three challenges are still faced in target detection based on sparse reconstruction methods: high complexity under an ultrahigh dimension, larger reconstruction errors under off-grid cases, non-constant false alarm rate (non-CFAR) detection based on reconstruction results.

The dimension of a signal model for radar signal processing is generally huge, and how to perform sparse reconstruction with low computational complexity is key issue for the application of radar target detection. Iterative threshold algorithms have relatively low complexity. However, such methods have a slow convergence rate and the noise during the iteration process deviate from Gaussian distribution, resulting in poor target reconstruction performance. In addition, since the statistical characteristics analysis of the noise is difficult, it is difficult to perform constant false alarm rate (CFAR) detection based on the reconstruction result. An approximate message passing (AMP) method improves target reconstruction accuracy while maintaining relatively low complexity; however, when applied to the radar target detection and estimation, it is still required for AMP method to reduce dimension.

For off-grid problem, there are mainly two kinds of methods. One kind of methods establish a revised observation model by taking observation errors into consideration. Though the observation matrix and a target vector in the model are both unknown, the solution can be obtained using an alternative iteration method. Obviously, the iterative process greatly increases the complexity of the sparse recovery algorithm. The other kinds of methods are atomic norm based methods. Because those methods require ultrahigh-dimensional matrix decomposition, e.g., matrix inversion, their computational complexities are unaffordable in practice.

In addition, most of current methods focus on the reconstruction accuracy, and has less attention to false alarm rate and detection probability. How to perform target detection based on reconstruction results is difficult. Due to the nonlinearity of reconstruction methods, the statistical characteristics of the reconstructed output noise are closely related to the scenarios, and hence how to design a CFAR detector is challenge. Based on the AMP method, relevant scholars study the target detection, and the results show that the noise in an AMP iteration process still obeys Gaussian distribution under the limit condition of a large system, so that the design of a CFAR detector becomes possible. However, how to perform target detection effectively with dimension reduction is still an open problem.

SUMMARY

Objective: Aiming at the challenges faced by the conventional target detection method based on sparse reconstruction, the present invention provides a radar target detection method based on EBD.

Technical scheme: The radar target detection method based on EBD provided by the present invention comprises:

1) performing pulse compression and coherent integration on received baseband signal to obtain a range-Doppler map, performing pre-detection based on the range-Doppler map to obtain interested PDTs, wherein the corresponding ranges and Doppler frequencies of cells, wherein PDTs are pre-detected, are represented by $r_\wp$ and $f_\wp$, respectively;

2) estimating the PDT range and the Doppler parameter obtained by pre-detection to obtain estimated values $\hat{r}_\wp$ and $\hat{f}_\wp$;

3) establishing a dimension-reduction observation model of a received signal based on $\hat{r}_\wp$ and $\hat{f}_\wp$;

4) reconstructing a target vector in the dimension-reduction observation model based on a sparse recovery algorithm; and 5) adopting a generalized likelihood ratio detector for target detection based on the reconstruction result and outputting target detection results and their parameters.

Beneficial effects: The present invention establishes a dimension-reduction observation model based on the estimates of PDTs' parameters, then, by exploiting the sparsity of the received signal, a sparse recovery algorithm is adopted to perform target reconstruction and detection, three challenges, i.e., dimension reduction under an ultrahigh dimension, accurate reconstruction under off-grid conditions and CFAR target detection based on nonlinear reconstruction results are addressed. The present invention carries out parameter estimation before target detection and makes "matching" signal processing possible. The present invention can greatly reduce signal processing loss and improve target detection performance. Results of both simulation and measured data show that the target detection performance of the present invention is improved by more than 1.5 dB compared with the conventional method.

DETAILED DESCRIPTION

The technical scheme of the present invention is further described below with reference to the drawings.

Figure 1:
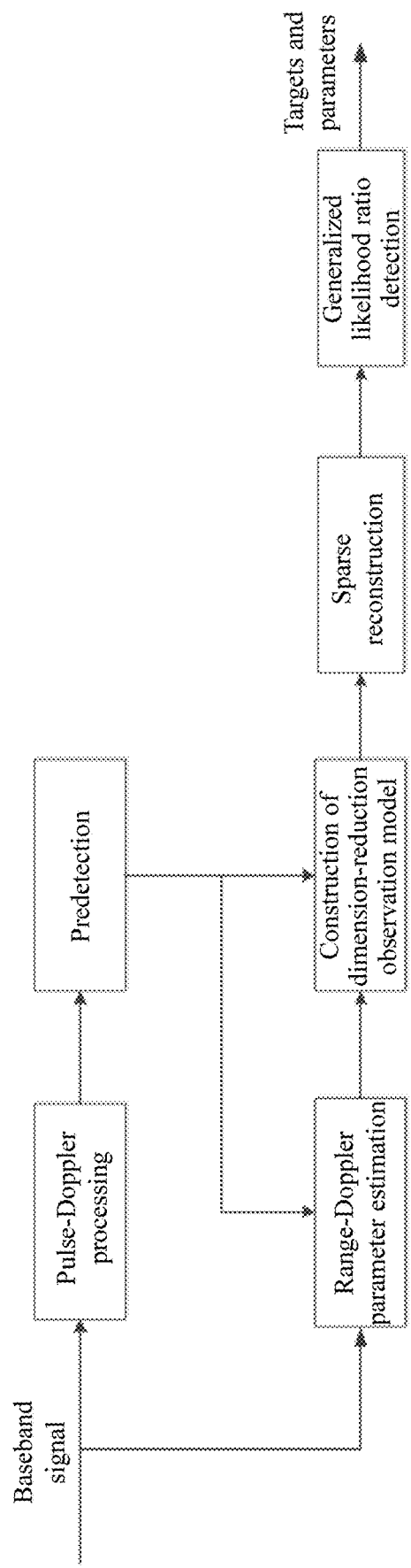
FIG. 1 is a flowchart of the radar target detection method based on EBD according to the present invention.

The present invention is applicable to pulse radar system adopting linear frequency modulation waveform, and a target detection processing process is shown as FIG. 1 and comprises:

Step 1) performing conventional pulse compression and coherent integration on received baseband signal to obtain a range-Doppler map, and performing pre-detection based on the range-Doppler map to obtain interested PDTs.

Since the signal model in spatial domain is similar to the slow time domain, the present invention considers the fast time domain and the slow time domain. Assuming that a number of range cells in one coherent processing interval is L, a number of pulses is K, and the received signal can be represented as a matrix $Y \in \mathbb{C}^{L \times K}$. Neglecting the range and Doppler migration, the elements thereof can be represented as:

$$y_{l,k} = \sum_{p=0}^{P-1} \alpha_p rect\left(\frac{lT_s - 2r_p/c}{T_{pul}}\right) \exp\left(j\pi\mu(lT_s - 2r_p/c)^2 + j2\pi f_{d,p}kT_I\right) + n_{l,k}, \quad (1)$$

wherein $y^{l,k}$ is an $l^{th}$ range cell and a $k^{th}$ pulse echo signal, $0 \le k \le K-1$, and $0 \le l \le L-1$. P is a number of the target, $T_s$ is a sampling time interval, $\alpha_p$ is a $p^{th}$ target amplitude, $r_p$ is a target range, $T_{pul}$ is a pulse duration, $T_I$ is a pulse interval, $\mu$ is a frequency modulation slope, and c is light speed. $f_{d,p}=2v_p/\lambda$ is Doppler shift, up is a target speed, and $\lambda$ is a carrier wavelength. $n_{l,k}$ is additive white Gaussian noise. rect(.) represents a rectangular function.

Pulse compression is performed in fast time domain and coherent integration is performed in slow time domain to obtain a range-Doppler map. Then, based on the range-Doppler map, a conventional CFAR detection method is adopted for target pre-detection to obtain interested PDTs, wherein the corresponding ranges and Doppler frequencies of cells, wherein PDTs are pre-detected, are represented by $r_\zeta$ and $f_\zeta$, respectively.

Step 2) estimating the PDT range and the Doppler parameter obtained by pre-detection to obtain estimated values $\hat{r}_\varrho$ and $\hat{f}_\varrho$;

assuming that the number of the PDTs is I, and the corresponding range $r_\zeta$ and Doppler frequency $f_\zeta$ can be calculated according to the range cell and the frequency cell wherein the I PDTs are located, respectively.

The PDTs comprise the main components of the received signal, thus, based on I, $r_\zeta$ and $f_\zeta$, the received signal can be approximately represented as:

$$y \approx A_\zeta \beta + n, \quad (2)$$

wherein Y represents the received signal of one coherent processing interval, and is obtained by vectorizing Y through stacking the columns into a vector; $\beta$ is a dimension-reduction target vector, an $i^{th}$ element $\beta_i$ thereof represents the true complex amplitude of an $i^{th}$ PDT; and if the $i^{th}$ PDT is a false alarm, then $\beta_i=0$. n is an additive white Gaussian noise vector. $A_\zeta \in \mathbb{C}^{LK \times I}$ is an approximate dimension-reduction observation matrix, and an $i^{th}$ column thereof is represented as:

$$a_{\zeta,i} = s_d(f_{\zeta,i}) \otimes s_i(r_{\zeta,i}), \quad (3)$$

wherein the symbol $\otimes$ represents Kronecker product, $s_d(f_{\zeta,i})$ represents the Doppler domain steering vector corresponding to the PDT with a Doppler frequency of $f_{\zeta,i}$, and $s_i(r_{\zeta,i})$ represents the fast-time domain steering vector corresponding to the PDT with a range of $r_{\zeta,i}$, $s_d(f_{\zeta,i})$ and $s_i(r_{\zeta,i})$ are represented respectively as:

$$s_d(f_{\zeta,i})=[1, \ldots, \exp(j2\pi f_{\zeta,i}kT_I), \ldots, \exp(j2\pi f_{\zeta,i}(K-1)T_I)]^T, \quad (4)$$

$$s_i(r_{\zeta,i})=[q_i(0), \ldots, q_i(l), \ldots, q_i(L-1)]^T \quad (5)$$

wherein the superscript T represents transpose; wherein, $$q_i(l) = rect\left(\frac{lT_s - 2r_{\zeta,i}/c}{T_{pul}}\right) \exp\left(j\pi\mu(lT_s - 2r_{\zeta,i}/c)^2\right). \quad (6)$$

Generally, $\beta$ is still sparse, and reconstruction of $\beta$ can be performed based on sparse recovery; assuming that the reconstruction result is represented as $\hat{\beta}$, then target detection can be realized based on $\hat{\beta}$. However, in practical applications, the PDTs are not located in integer cells, that is, $r_\zeta$ and $f_\zeta$ deviate from the true PDT values, and the reconstruction directly based on the equation (2) is faced with the off-grid problem. In this regard, the present invention firstly estimates the true parameters $r_\varrho$ and $f_\varrho$ of the PDTs based on $r_\zeta$ and $f_\zeta$, and then performs the target reconstruction and detection.

Assuming that the true observation matrix corresponding to the PDTs is $A_\varrho$, ignoring the effect of missed detection targets during pre-detection, the received signal can be represented as:

$$y = A_\varrho(\theta_\varrho) \beta + n \quad (7)$$

wherein $\theta_\varrho = [r_\varrho; f_\varrho]$, the symbol; is used for connecting two vectors to form a vector. An $i^{th}$ column of $AA_\varrho$ is $a_{\varrho,i} = s_d(f_{\varrho,i}) \otimes s_i(r_{\varrho,i})$. $A_\varrho$ is unknown, however, $A_\varrho$ is obviously very close to $A_\zeta$, that is, the true target parameters are close to parameters corresponding to the integer cells wherein the PDT are located. Let $\theta_\varrho = [r_\zeta; f_\zeta]$, $r_\zeta$ and $f_\zeta$ are known. Since $A_\varrho$ is very close to $A_\zeta$, then $\theta_\varrho$ is also very close to $\theta_\zeta$, i.e., $\|\theta_\varrho - \theta_\zeta\|$ is very small. Therefore, in the present invention, it is considered to estimate $\theta_\varrho$ based on $\theta_\zeta$. Then, the observation matrix $A_\varrho$ can be obtained. The specific procedures are as follows:

based on a maximum likelihood criterion, estimates of $\theta_\varrho$ and $\beta$ are given as:

$$\{\hat{\theta}_\varrho, \hat{\beta}\} = \arg \min_{\theta,\beta} \|y - A(\theta)\beta\|_2^2, \quad (8)$$

wherein $\theta = [r; f]$, $r$ and $f$ represent the range and the Doppler frequency, respectively; the minimum over $\beta$ is attained for:

$$\hat{\beta} = (A(\theta)^H A(\theta))^{-1} A(\theta)^H y \quad (9)$$

then the cost function in the equation (8) can be further represented as:

$$g(\theta) = \|y - A(\theta)(A(\theta)^H A(\theta))^{-1} A(\theta)^H y\|_2^2 \quad (10)$$

Obviously, a minimum value of the equation (10) is obtained at $\theta = \theta_\varrho$. A first-order Taylor approximation is performed on a first-order derivative of $g(\theta)$ at $\theta_\varrho$ to obtain:

$$\nabla_\theta g(\theta) \approx \nabla_\theta g(\theta_\varrho) + \nabla_\theta^2 g(\theta_\varrho)(\theta - \theta_\varrho), \quad (11)$$

Obviously, $\nabla_\theta g(\theta_\varrho) = 0$, then, $$\theta_\varrho \approx \theta - (\nabla_\theta^2 g(\theta_\varrho))^{-1}(\nabla_\theta g(\theta)). \quad (12)$$

Because $\theta_\varrho$ is also very close to $\theta_\zeta$, $\theta$ is substituted with $\theta_\zeta$, and $\theta_\varrho$ in the Hessian matrix $(\nabla_\theta^2 g(\theta_\varrho))$ is substituted with $\theta_\zeta$ to obtain the estimate of $\theta_\varrho$:

$$\hat{\theta}_\varrho \approx \theta_\zeta - (\nabla_\theta^2 g(\theta_\zeta))^{-1}(\nabla_\theta g(\theta_\zeta)). \quad (13)$$

In the equation (13), the first-order derivative vector and the second-order derivative matrix of $g(\theta)$ are required to be calculated, and the calculation is very complicated; therefore, a simplified solution method is further given below.

The following equation can be obtained from the equation (7):

$$W_i y = W_i A_\varrho(\theta_\varrho) \beta + W_i n \quad (14)$$

wherein $W_i = \mathrm{diag}(w_i) = \mathrm{diag}(w_d \otimes w_{l,i})$, $w_d$ represents a normalized window function in the slow time domain, $w_{l,i}$ represents a normalized window function in the fast time domain of the $i^{th}$ PDT, $w_{l,i} = [q_{w,0}, \ldots, q_{w,l}, \ldots, q_{w,L-1}]^T$, and $$q_{w,l} = rect\left(\frac{lT_s - 2r_{\zeta,i}/c}{T_{pul}}\right) w_c(lT_s - 2r_{\zeta,i}/c). \quad (15)$$

$w_c(t)$ is a continuous form of the window function in a time $T_{pul}$. In the case of normalization, obviously, $\|w_i\|_2^2 = \|W_i\|_F = 1$, wherein the subscript F represents the Frobenius norm of the matrix. Then, based on the least squares criterion, the estimates of $\theta_\varrho$ and $\beta$ is:

$$\{\hat{\theta}_\varrho, \hat{\beta}\} = \arg \min_{\theta,\beta} \|W_i y - W_i A(\theta)\beta\|_2^2. \quad (16)$$

The equation (14) actually weights the data in the fast and slow time domains, and the weighting can be used to decouple the $i^{th}$ PDT from other PDTs in the echo, that is, the $i^{th}$ PDT and other PDTs have approximately no mutual influence. Then, $g(\theta)$ can be further approximately represented as:

$$g(\theta) = \|W_i y - \beta_i W_i a_i(\eta_i)\|_2^2 + \|W_i y - W_i A_{\setminus i}(\theta)\beta_{\setminus i}\|_2^2 - (W_i y)^H W_i y \quad (17)$$

wherein $\eta_i = [r_i, f_i]^T$, $r_i$ and $f_i$ represent the range and the Doppler frequency of the $i^{th}$ PDT, respectively; $a_i$ represents the steering vector of the $i^{th}$ PDT which is calculated by the equation (3), $A_{\setminus i}$ denotes the matrix obtained from A by deleting the $i^{th}$ column, and $\beta_{\setminus i}$ denotes the vector obtained from $\beta$ by deleting the $i^{th}$ entry, to minimizing $g(\theta)$, $u_i(\eta_i) = \|W_i y - \beta_i W_i a_i(\eta_i)\|_2^2$ should attain its minimum. Then, the estimate of the $i^{th}$ PDT, denoted by $\hat{\eta}_{\varrho,i} = [\hat{r}_{\varrho,i}, \hat{f}_{\varrho,i}]^T$, can be obtained by minimizing $u_i(\eta_i)$.

Minimizing $u_i(\eta_i)$ the estimate of $\beta_i$ is given by:

$$\hat{\beta}_i = a_i^H(\eta_i) W_i^2 y. \quad (18)$$

Inserting equation (18) into $u_i(\eta_i)$, then, minimizing $u_i(\eta_i)$ is equivalent to minimizing the following equation:

$$z_i(\eta_i) = (a_i^H(\eta_i) W_i^2 y)(y^H W_i^2 a_i(\eta_i)) \quad (19)$$

Referring to equation (13), the estimate of $\eta_{\varrho,i}$ is given by:

$$\begin{pmatrix} \hat{r}_{\varrho,i} \\ \hat{f}_{\varrho,i} \end{pmatrix} \approx \begin{pmatrix} r_{\zeta,i} \\ f_{\zeta,i} \end{pmatrix} - \begin{pmatrix} \frac{\partial^2 z_i}{\partial r_i^2} & 0 \\ 0 & \frac{\partial^2 z_i}{\partial f_i^2} \end{pmatrix}^{-1}_{(\eta_i = \eta_{\zeta,i})} \begin{pmatrix} \frac{\partial z_i}{\partial r_i} \\ \frac{\partial z_i}{\partial f_i} \end{pmatrix}_{(\eta_i = \eta_{\zeta,i})}, \quad (20)$$

wherein $\eta_{\zeta,i} = [r_{\zeta,i}, f_{\zeta,i}]^T$. In order to obtain higher estimation accuracy, the estimate is iteratively updated using the following equation:

$$\hat{\eta}_{\varrho,i}^t = \hat{\eta}_{\varrho,i}^{t-1} - (\nabla_\eta^2 z_i(\hat{\eta}_{\varrho,i}^{t-1}))^{-1} \nabla_\eta z_i(\hat{\eta}_{\varrho,i}^{t-1}), \quad (21)$$

wherein $\hat{\eta}_{\varrho,i}^0 = \eta_{\zeta,i}$, and t denotes the $t^{th}$ iteration usually, t=2 can meet the actual demand. Parameter estimation is performed for each PDT, and then $\hat{\theta}_\varrho$ can be obtained.

Step 3) establishing a dimension-reduction observation model of a received signal based on the estimated values $\hat{r}_\varrho$ and $\hat{f}_\varrho$;

$\hat{A}_\varrho$ can be obtained based on $\hat{\theta}_\varrho$ (i.e., $\hat{r}_\varrho$ and $\hat{f}_\varrho$), and the received signal, based on the $\hat{A}_\varrho$, may be further represented as:

$$y \approx \hat{A}_\varrho \beta + n. \quad (22)$$

Usually, the number I of the PDTs is much smaller than a number of the cells corresponding to the range-Doppler map; therefore, the equation (22) can greatly reduce the dimension of the vector to be reconstructed, and the equation (22) is the dimension-reduction observation model of the present invention.

Step 4) reconstructing a target vector based on the dimension-reduction observation model and the sparse recovery algorithm;

The present invention reconstructs β based on the generalized approximate message Passing (GAMP) algorithm and the equation (22). Assuming that β follows the i.i.d Bernoulli-Gaussian distribution, the marginal probability density function thereof is:

$$p(\beta_i) = (1-p)\delta(\beta_i) + p\mathcal{CN}(\beta_i; \kappa, \tau^q) \quad (23)$$

wherein δ is Dirac function, ρ denotes the fraction of nonzero components. κ and $\tau^q$ represent the mean and variance of the Gaussian components, respectively. ρ, κ and $\tau^q$ are all unknown, and expectation-maximum (EM) algorithm can incorporated to iteratively learn them.

Figure 3A:
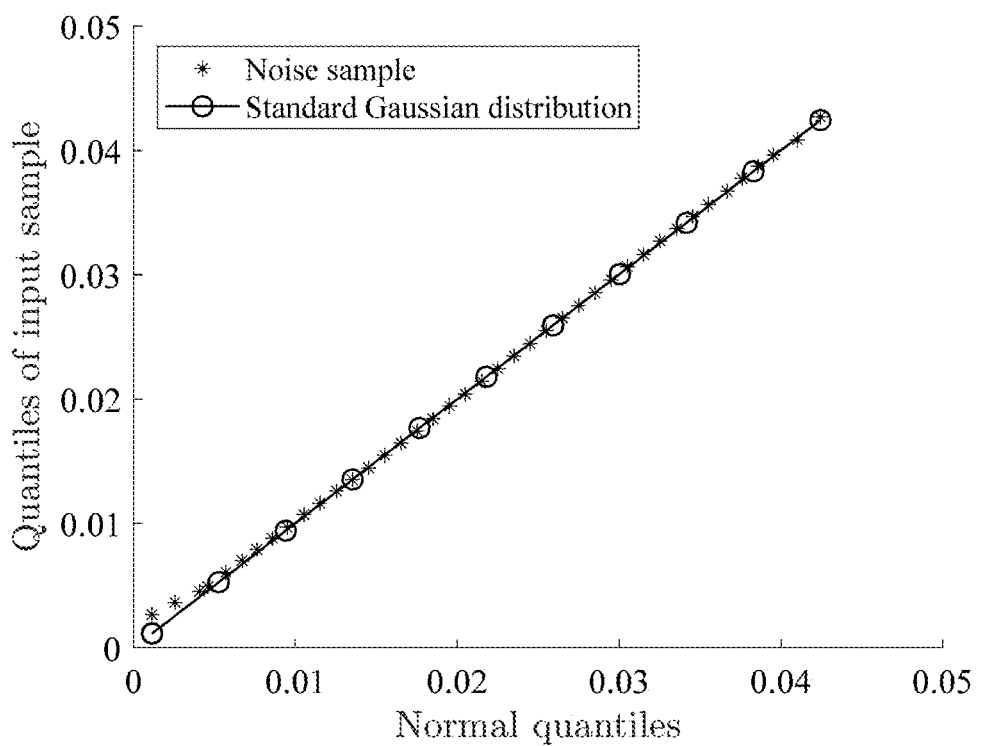
FIG. 3A to FIG. 3C are schematic diagrams of the statistical characteristics of the reconstructed output noise based on a dimension-reduction model according to an embodiment of the present invention.
Figure 3B:
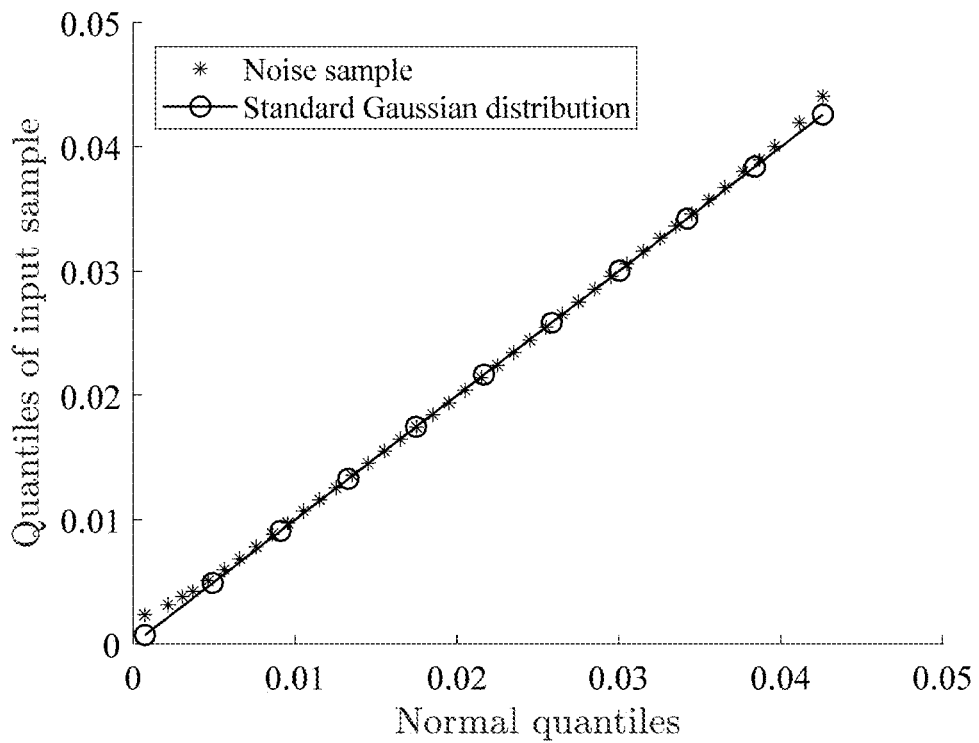
Figure 3C:
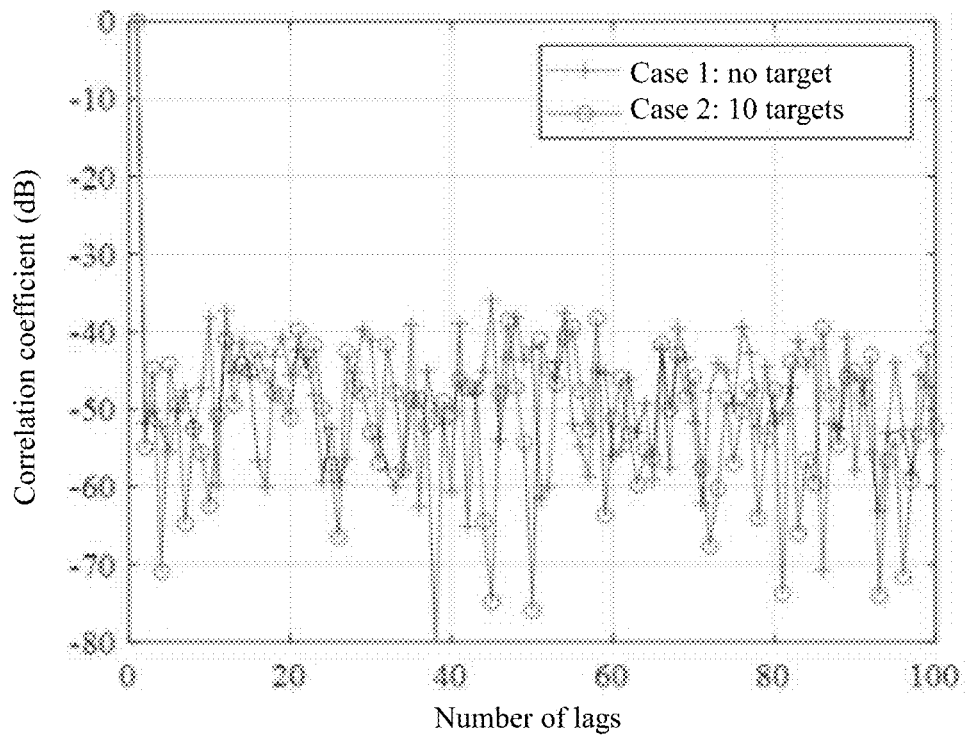

GAMP can find both a sparse estimate and a non-sparse, noisy estimate of β, denoted by $\hat{\beta}$ and $\bar{\beta}$, respectively. It can be proved that the modulus of the noise in the $\bar{\beta}$ approximately follows The Gaussian distribution, and the simulation result is shown in FIG. 3A to FIG. 3C.

Step 5) designing a generalized likelihood ratio detector based on the reconstruction result for target detection and outputting detection results and their parameters.

The present invention is based on $\bar{\beta}$ for target detection. Determining whether the $i^{th}$ PDT is a target or not can be summarized as the following hypothesis tests:

$$H_0: y = \mathbf{A}_{\varrho, \backslash i}\beta_{\backslash i} + n$$

$$H_1: y = \beta_i \mathbf{a}_{\varrho, i} + \mathbf{A}_{\varrho, \backslash i}\beta_{\backslash i} + n. \quad (24)$$

$H_0$ and $H_1$ are two hypotheses in the hypothesis tests. $H_0$ represents that the $i^{th}$ PDT is not the target, and $H_1$ represents that the $i^{th}$ PDT is the target. $\mathbf{a}_{\varrho,i}$ is the true steering vector of the $i^{th}$ PDT, and is also calculated by the equation (3).

Based on the generalized likelihood ratio criterion, the detector is given by:

$$|\bar{\beta}_i| \underset{H_0}{\overset{H_1}{\gtrless}} \gamma \tilde{\sigma}, \quad (25)$$

wherein $\tilde{\sigma}$ is the variance of the noise modulus in $\bar{\beta}$, and γ is the detection threshold; since the noise modulus follows approximately the Gaussian distribution, the equation (25) is a CFAR detector.

Figure 2A:
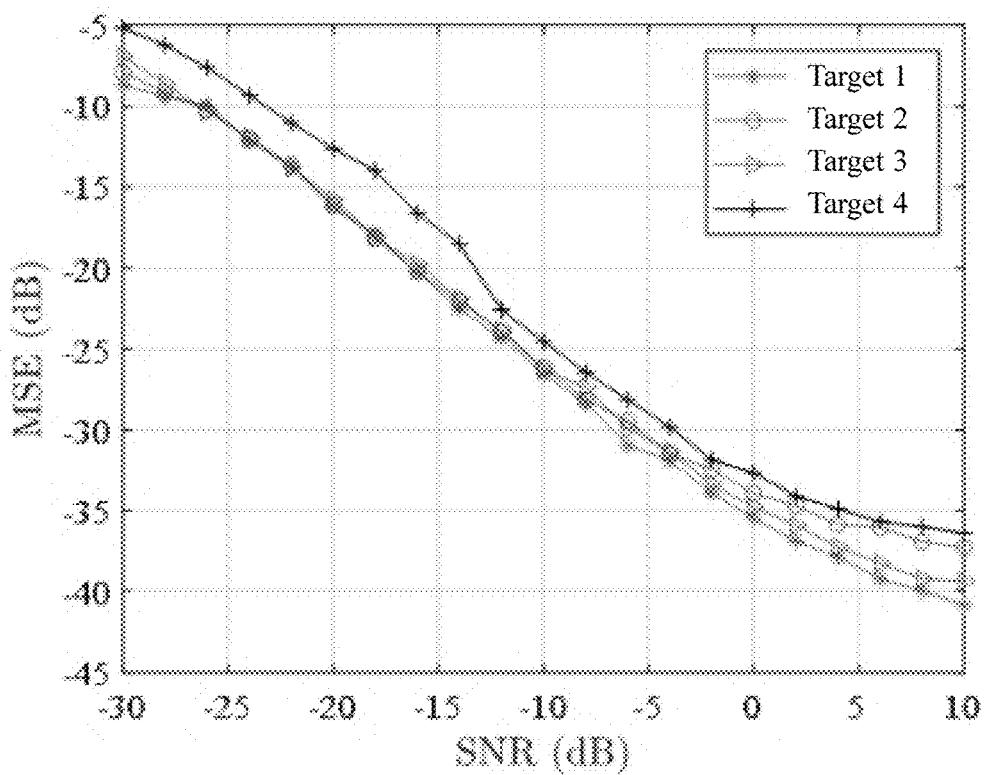
FIG. 2A to FIG. 2C are schematic diagrams of the estimation accuracy of the PDT parameters provided by an embodiment of the present invention.
Figure 2B:
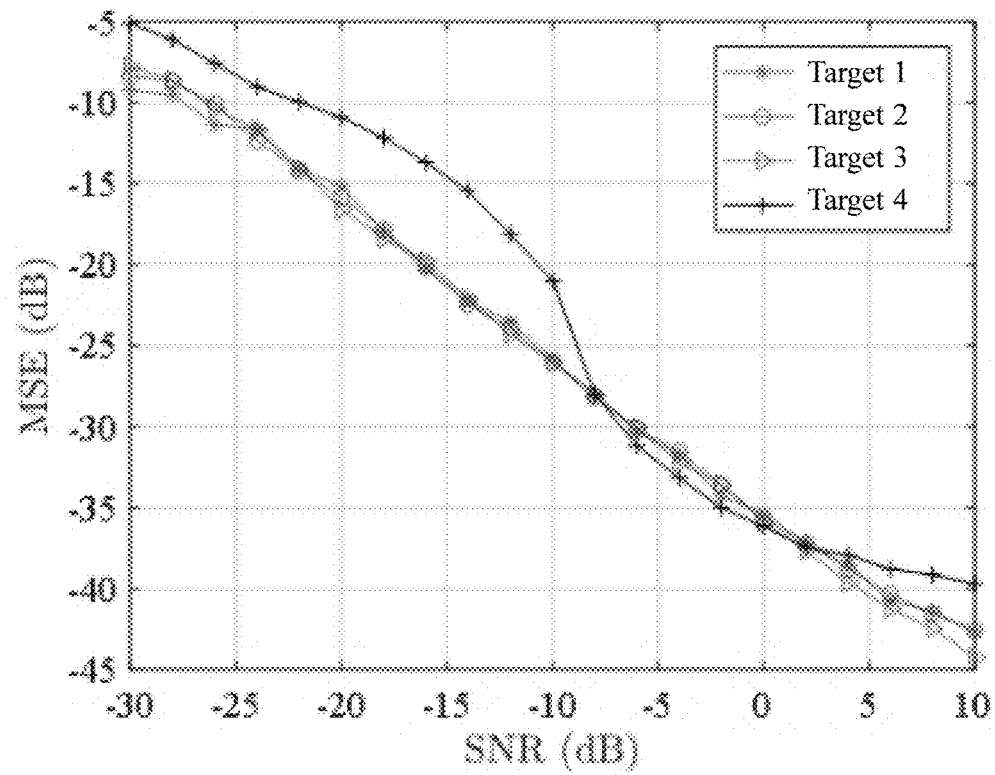
Figure 2C:
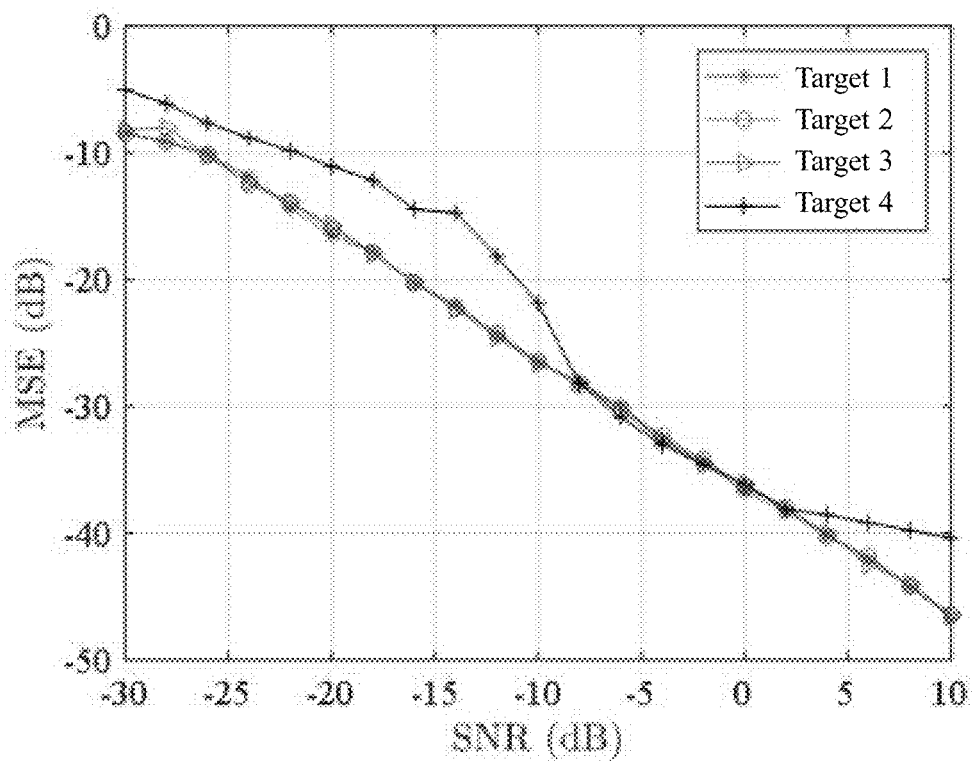

The implementation steps of the radar target detection method based on EBD provided by the present invention are described above, and the effectiveness of the method is verified by both and measured tests. The method of the present invention will be referred to as EBD below. FIG. 2A to FIG. 2C show the parameter performance of EBD in the present invention. Simulation parameters are shown in Table 1, 4 targets are added to the received signal and three following cases are considered: case 1: the target is located in the integer Doppler cells, and the range cells are 100, 100.2, 140.3, and 191.5 (the fractional part represents the value of deviation from the integer cells); case 2: the target is located in the integer range cells, and the frequency cells are 10, 15.2, 31.3 and 42.5; case 3: the Doppler and range cells of targets are all off-grid, and are set as (15.2,105.3), (31.2,140.4), (42.3,191.1) and (53.5,270.5), respectively; the target parameter estimation accuracy in all three cases is measured by mean square error (MSE), and the results are shown in FIG. 2A to FIG. 2C. The results show that the method of estimating the parameters before detection can effectively estimate the range and Doppler of the target.

TABLE 1

Radar simulation parameters

| Nos. | Parameters | Values |
|------|------------|--------|
| 1 | Pulse interval | 0.2 ms |
| 2 | Pulse width | 25 μs |
| 3 | Bandwidth | 4 MHz |
| 4 | Sampling rate | 5 MHz |
| 5 | Number of pulses | 5 |
| 6 | Number of FFT points | 64 |
| 7 | Window used in the fast time domain | Hamming |
| 8 | Window used in the slow time domain | Chebyshev, −45 dB |

FIG. 3A to FIG. 3C show the statistical characteristics of the noise modulus in the reconstruction result $\bar{\beta}$. The following 2 cases are considered: case 1: the received signal contains no target; case 2: 10 targets are added to the received signal, and the SNRs are 0 dB. When the noise characteristics are counted, the true target samples are removed, that is, only the noise samples are counted. FIG. 3A and FIG. 3B show the quantile-quantile plot (Q-Q plot) curves of the noise samples in both cases, respectively, and are compared with the standard Gaussian distribution. FIG. 3C shows the correlation coefficient of the noise samples in both cases. The results show that the noise approximately follows independent Gaussian distribution.

Figure 4A:
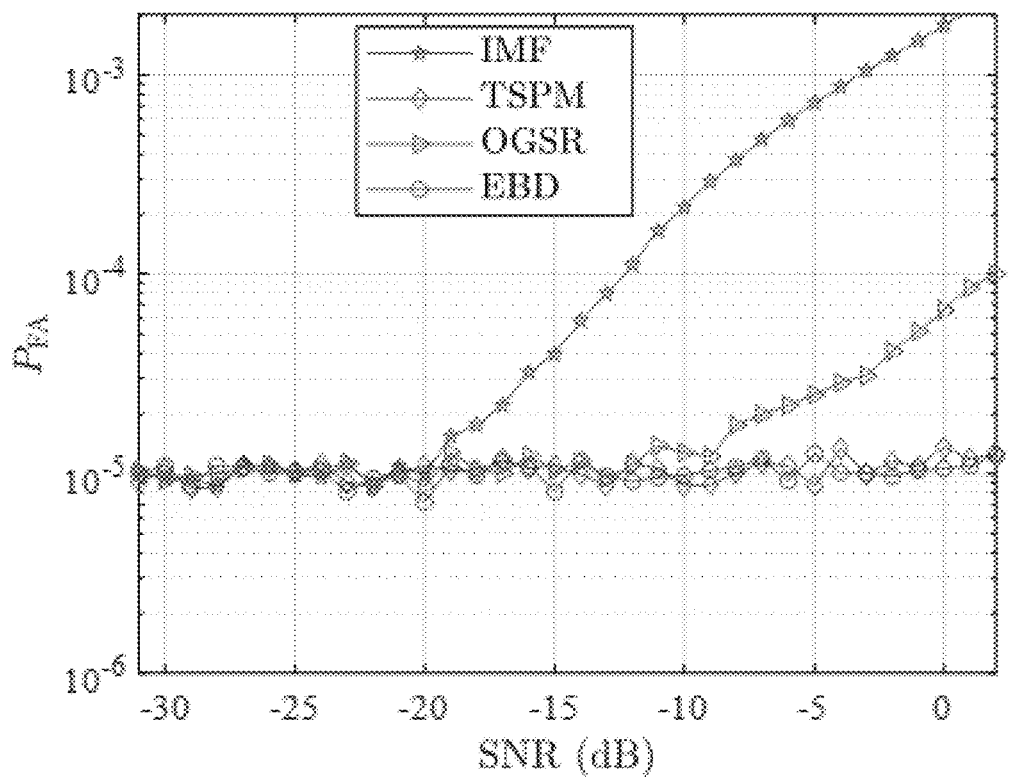
FIG. 4A and FIG. 4B are comparison diagrams of the target detection performances of 4 detectors under simulation conditions according to an embodiment of the present invention.
Figure 4B:
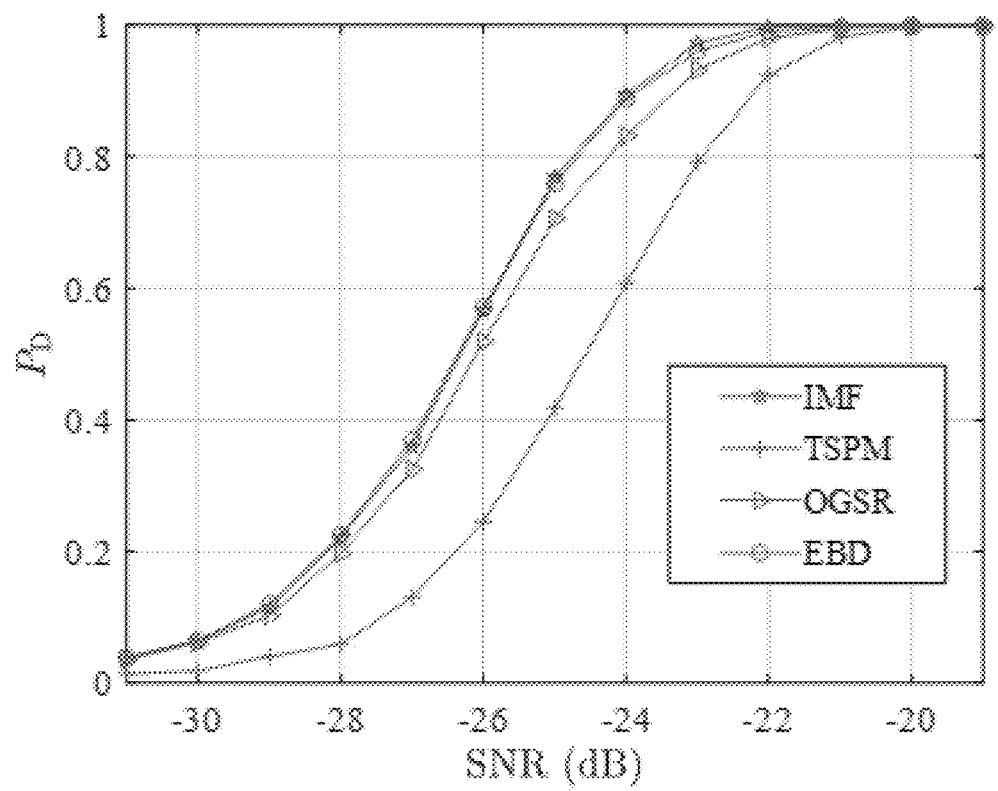

In FIG. 4A and FIG. 4B, the performance of the EBD provided by the present invention is compared with 3 other detectors including the conventional detection method (TSPM, windowed), the ideal matched filtering (IMF, not windowed), the method of off-grid sparse recovery (OGSR) based on the equation (2). In the simulation, the parameters shown in Table 1 are still adopted, 10 targets are added in each simulation, the target range and Doppler are randomly generated. Simulation results show that EBD is approximately a CFAR detector within the entire interval of SNR, and the gain of detection performance is about 1.9 dB compared with the conventional detection method (TSPM) under the condition that the false alarm rate is $10^{-5}$.

Figure 5A:
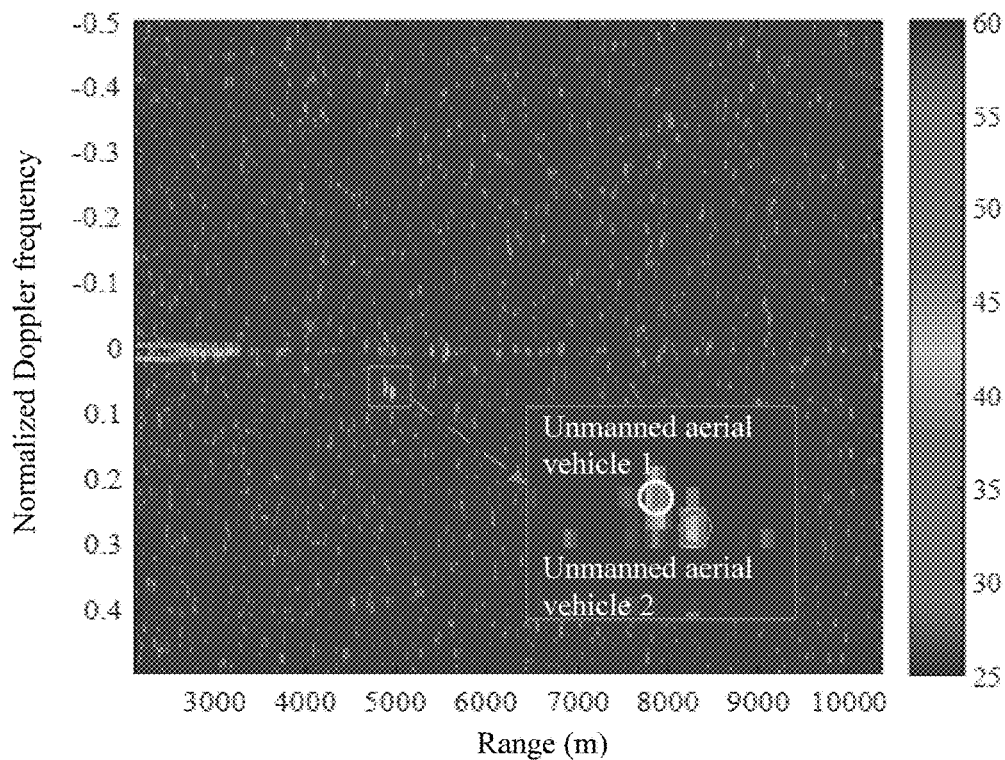
FIG. 5A and FIG. 5B are schematic diagrams of the range-Doppler map of the measured data provided by an embodiment of the present invention.
Figure 5B:
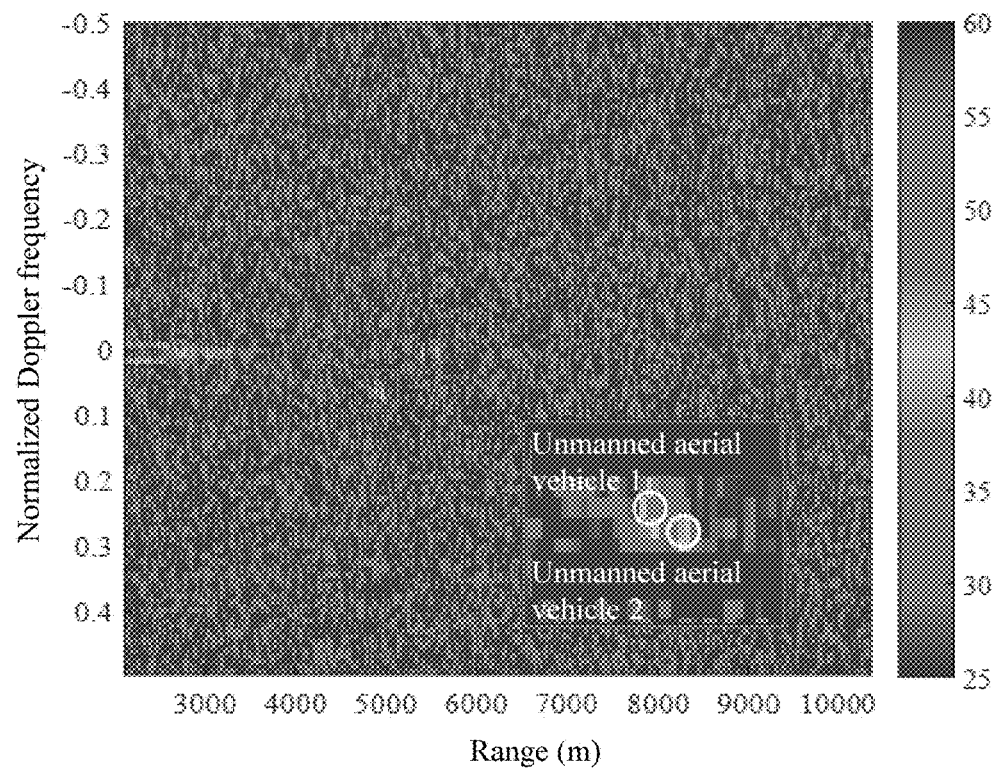
Figure 6:
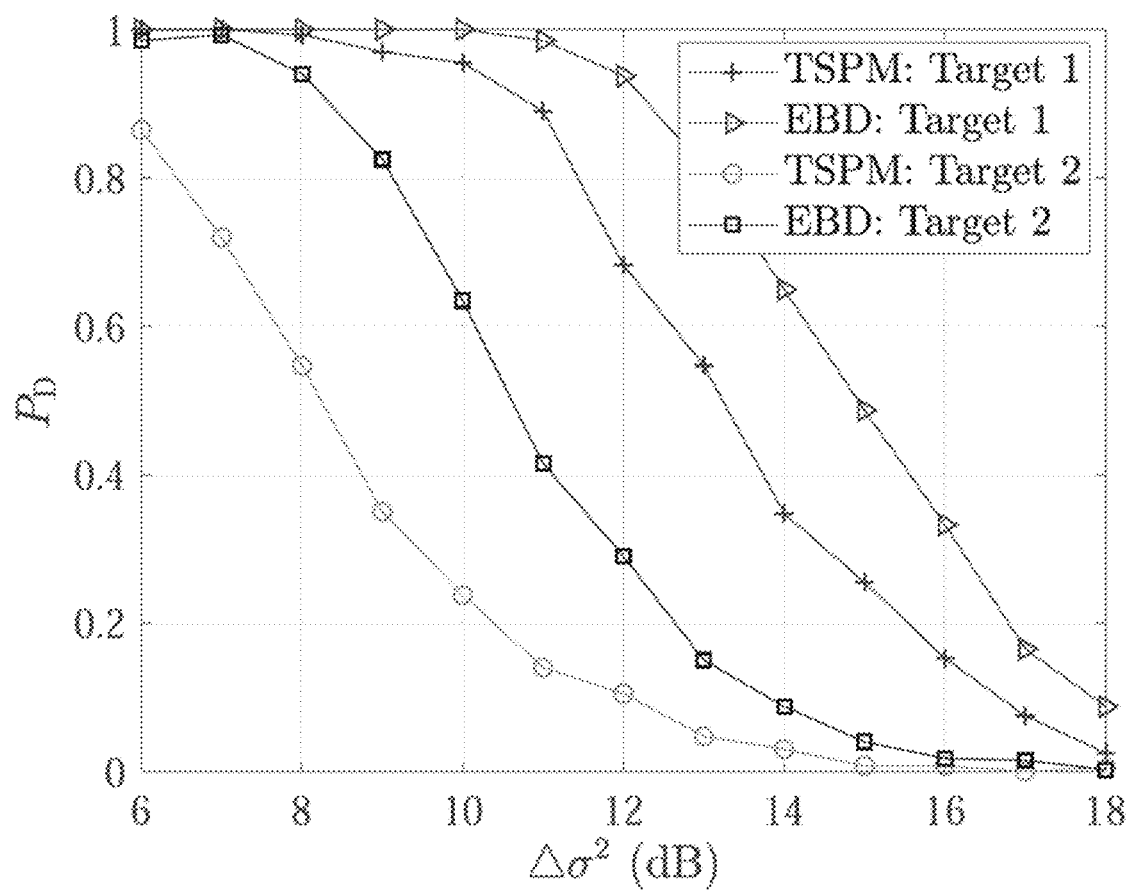
FIG. 6 is a schematic diagram showing the comparison between the performance of the method of the present invention and that of the conventional method using measured data.

FIG. 5A. FIG. 5B and FIG. 6 verify the method of the present invention based on the measured data. The radar parameters corresponding to the adopted data are as follows: the bandwidth is 8 MHz, the sampling rate is 10 MHz, the pulse width is 12 microseconds, the number of single frame pulses is 128, the number of FFT points is 128, and the repetition frequency is 12.5 KHz. In the test, two unmanned aerial vehicles DJI Phantom 3 are used as cooperative targets, 1 frame is selected for analysis, and the range-Doppler map is shown in FIG. 5A. The selected frame contains no other target. Because the SNRs of the two unmanned aerial vehicles are high and are 26.3 dB and 21.3 dB, respectively; in order to verify the performance of the provided algorithm, the white Gaussian noise is added to the original received signal. For example, after increasing the noise level by 6 dB, the range-Doppler map using the conventional processing is as shown in FIG. 5B.

The performance comparison between the EBD and TSPM is shown in FIG. 6, wherein the abscissa represents the noise increment and is represented by $\Delta\sigma_n^2$. It can be seen from the results that the EBD has a better noise resistance ability, i.e., better target detection performance, than TSPM. For both cooperative targets, the EBD has performance gains of 2.2 dB and 1.5 dB, respectively, at a false alarm rate of $10^{-5}$.

What is claimed is:

1. A radar target detection method based on estimation before detection (EBD), comprising:
   1) obtaining baseband signal by a receiver, and performing pulse compression and coherent integration on the baseband signal to obtain a range-Doppler map, performing pre-detection based on the range-Doppler map to obtain interested pre-detect targets (PDTs), wherein the corresponding ranges and Doppler frequencies of cells, wherein the PDTs are pre-detected, are represented by $r_\zeta$ and $f_\zeta$, respectively;
   2) estimating ranges and the Doppler frequencies of the PDTs, wherein the estimates are represented by $\hat{r}_\varrho$ and $\hat{f}_\varrho$;
   3) establishing a dimension-reduction observation model of a received signal based on $\hat{r}_\varrho$ and $\hat{f}_\varrho$;
   4) reconstructing a target vector in the dimension-reduction observation model based on a sparse recovery algorithm; and
   5) adopting a generalized likelihood ratio detector for target detection based on a reconstruction result and outputting target detection results and their parameters, and determining whether the PDTs are true targets based on the target vector,
   wherein the step 2) comprises:
   adopting $r_\varrho$ and $f_\varrho$ to represent true ranges and Doppler frequencies of the PDTs, respectively, and letting $\theta_\varrho = [r_\varrho; f_\varrho]$ and $\theta_\zeta = [r_\zeta; f_\zeta]$, wherein the symbol; in the square brackets represents connecting two vectors, the received signal is represented as:

$$y = A_\varrho(\theta_\varrho)\beta + n \quad (7)$$

y in the equation (7) represents a received signal of one coherent processing interval, wherein $\beta$ is a dimension-reduction target vector, an $i^{th}$ element $\beta_i$ represents a true complex amplitude of an $i^{th}$ PDT, $A_\varrho$ is an observation matrix, and n is an additive white Gaussian noise vector;
   based on a maximum likelihood criterion, estimates of $A_\varrho$ and $\beta$ are given as:

$$\{\hat{\theta}_\varrho, \hat{\beta}\} = \arg\min_{\theta,\beta} \|y - A(\theta)\beta\|_2^2, \quad (8)$$

wherein $\theta = [r; f]$, a minimum over $\beta$ is attained for:

$$\hat{\beta} = (A(\theta)^H A(\theta))^{-1} A(\theta)^H y \quad (9)$$

then, minimizing a cost function in (8) is equivalent to minimizing the function:

$$g(\theta) = \|y - A(\theta)(A(\theta)^H A(\theta))^{-1} A(\theta)^H y\|_2^2, \quad (10)$$

obviously, a minimum value of the equation (10) is obtained at $\theta = \theta_\varrho$, the derivative of $g(\theta)$ at $\theta_\varrho$ is evaluated by the first-order Taylor series:

$$\nabla_\theta g(\theta) \approx \nabla_\theta g(\theta_\varrho) + \nabla_\theta^2 g(\theta_\varrho)(\theta - \theta_\varrho), \quad (11)$$

obviously, $\nabla_\theta g(\theta_\varrho) = 0$, then:

$$\theta_\varrho \approx \theta - (\nabla_\theta^2 g(\theta_\varrho))^{-1}(\nabla_\theta g(\theta)) \quad (12)$$

$\theta$ is replaced with $\theta_\zeta$ to obtain an estimate of $\theta_\varrho$:

$$\hat{\theta}_\varrho \approx \theta_\zeta - (\nabla_\theta^2 g(\theta_\zeta))^{-1}(\nabla_\theta g(\theta_\zeta)). \quad (13)$$

2. The radar target detection method based on the EBD according to claim 1, wherein a simplified method used for the estimate of $\theta_\varrho$ comprises:
according to equation (7), one has:

$$W_i y = W_i A_\varrho(\theta_\varrho)\beta + W_i n \quad (14)$$

wherein $W_i = \text{diag}(w_i) = \text{diag}(w_d \otimes w_{I,i})$, $w_d$ represents a normalization window function in slow time domain, $w_{I,i}$ represents a normalization window function in fast time domain of the i (i=1, 2, . . . , I)$^{th}$ PDT, and I represents a number of the PDTs; in case of normalization, obviously, $|w_i|_2^2 = \|W_i\|F = 1$, then the estimate of $\theta_\varrho$ and $\beta$ is represented based on a least squares criterion as:

$$\{\hat{\theta}_\varrho, \hat{\beta}\} = \arg\min_{\theta,\beta} \|W_i y - W_i A(\theta)\beta\|_2^2 \quad (16)$$

$g(\theta)$ is further represented as:

$$g(\theta) = \|W_i y - \beta_i W_i a_i(\eta_i)\|_2^2 + W_i y - W_i A_{\setminus i}(\theta)\beta_{\setminus i}\|_2^2 - (W_i y)^H W_i y \quad (17)$$

wherein $\eta_i = [r_i, f_i]^T$, $r_i$ and $f_i$ represent the range and the Doppler, respectively, $a_i$ represents a steering vector of the $i^{th}$ PDT, $A_{\setminus i}$ denotes the matrix obtained from A by deleting the $i^{th}$ column and $\beta_{\setminus i}$ denotes the vector obtained from $\beta$ by deleting the $i^{th}$ entry $\beta$, to minimizing $g(\theta)$, $u_i(\eta_i) = \|W_i y - \beta_i W_i a_i(\eta_i)\|_2^2$ should attain its minimum, then, the estimate of the $i^{th}$ PDT, denoted by $\hat{\eta}_{\varrho,i} = [\hat{r}_{\varrho,i}, \hat{f}_{\varrho,i}]^T$, can be obtained by minimizing $u_i(\eta_i)$ $u_i(\eta_i)$;

minimizing $u_i(\eta_i)$, the estimate of $\beta_i$ is given by:

$$\hat{\beta}_i = a_i^H(\eta_i) W_i^2 y, \quad (18)$$

inserting equation (18) into $u_i(\eta_i)$, then, minimizing $u_i(\eta_i)$ is equivalent to minimizing the following equation:

$$z_i(\eta_i) = (a_i^H(\eta_i) W_i^2 y)(y^H W_i^2 a_i(\eta_i)) \quad (19)$$

and referring to equation (13), the estimate of $\hat{\eta}_{\varrho,i}$ is given by:

$$\begin{pmatrix} \hat{r}_{\varrho,i} \\ \hat{f}_{\varrho,i} \end{pmatrix} \approx \begin{pmatrix} r_{\zeta,i} \\ f_{\zeta,i} \end{pmatrix} - \begin{pmatrix} \frac{\partial^2 z_i}{\partial r_i^2} & 0 \\ 0 & \frac{\partial^2 z_i}{\partial f_i^2} \end{pmatrix}_{(\eta_i = \eta_{\zeta,i})}^{-1} \begin{pmatrix} \frac{\partial z_i}{\partial r_i} \\ \frac{\partial z_i}{\partial f_i} \end{pmatrix}_{(\eta_i = \eta_{\zeta,i})}, \quad (20)$$

wherein $\eta_{\zeta,i} = [r_{\zeta,i}, f_{\zeta,i}]^T$; the estimate is iteratively updated using the following equation:

$$\hat{\eta}_{\varrho,i}^l = \hat{\eta}_{\varrho,i}^{l-1} - (\nabla_\eta^2 z_i(\hat{\eta}_{\varrho,i}^{l-1}))^{-1} \nabla_\eta z_i(\hat{\eta}_{\varrho,i}^{l-1}), \quad (21)$$

wherein $\hat{\eta}_{\varrho,i}^0 = \eta_{\zeta,i}$ and t is a number of iterations.

3. The radar target detection method based on the EBD according to claim 1, wherein the step 3) comprises:

obtaining $\hat{A}_\varrho$ based on $\hat{\theta}_\varrho$; and representing the received signal as $y \approx \hat{\theta}_\varrho \beta + n$, i.e., the dimension-reduction observation model, based on the estimated $\hat{A}_\varrho$.

4. The radar target detection method based on the EBD according to claim 1, wherein the generalized likelihood ratio detector for the target detection in the step 5) is:

$$|\hat{\beta}_i| \underset{H_0}{\overset{H_1}{\gtrless}} \gamma \tilde{\sigma},$$

wherein $\gamma$ is a detection threshold, $\tilde{\sigma}$ is the noise level in $\hat{\beta}$.

* * * * *